United States Patent [19]

Nakao et al.

[11] Patent Number: 4,763,919
[45] Date of Patent: Aug. 16, 1988

[54] BABY CARRIAGE SERVING AS SHOPPING CART

[75] Inventors: Shinroku Nakao, Kanagawa; Yoshiyasu Ishii, Tokyo; Kenshun Ishii, Tokyo; Hiroaki Matsuda, Tokyo; Takashi Ishikura, Tokyo; Yuuichi Arai, Tokyo, all of Japan

[73] Assignee: Combi Co., Ltd., Tokyo, Japan

[21] Appl. No.: 58,731

[22] Filed: Jun. 5, 1987

[30] Foreign Application Priority Data

Jun. 5, 1986 [JP] Japan .............................. 61-84805[U]
Jul. 4, 1986 [JP] Japan ............................ 61-102011[U]

[51] Int. Cl.⁴ ............................ B62B 9/12; B62B 7/08
[52] U.S. Cl. .................................... 280/644; 280/658; 280/47.35; 280/47.4; 297/192; 297/193
[58] Field of Search ............ 280/47.35, 47.4, 33.99 H, 280/642, 643, 644, 647, 47.18, 47.38, 650, 658; 297/189, 192, 193; 224/273, 42.42 R

[56] References Cited

U.S. PATENT DOCUMENTS

| | | | |
|---|---|---|---|
| 210,487 | 12/1878 | Bovey | 297/192 |
| 2,545,336 | 3/1951 | Binder | 280/650 |
| 2,577,579 | 12/1951 | Hall | 280/643 |
| 2,917,316 | 12/1959 | Gill | 280/643 |
| 4,317,581 | 3/1982 | Kassai | 280/644 |
| 4,346,912 | 8/1982 | Habib | 280/644 |

Primary Examiner—David M. Mitchell
Attorney, Agent, or Firm—Sughrue, Mion, Zinn, Macpeak, and Seas

[57] ABSTRACT

A combination baby carriage and shopping cart in which the main baby carriage part comprises foldable front and rear leg bars and a handle bar. A soft basket is supported by a U-shaped frame pivoting at its front on the baby carriage. The rear of the basket has a folding panel or belt which, when folded, is attachable at its middle to an upper portion of the baby carriage backrest so as to collapse the basket.

11 Claims, 9 Drawing Sheets

FIG. 3(A)
FIG. 3(B)
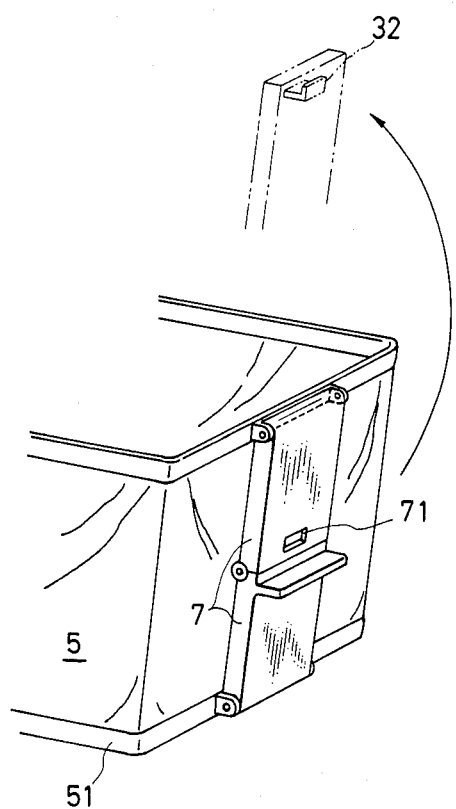
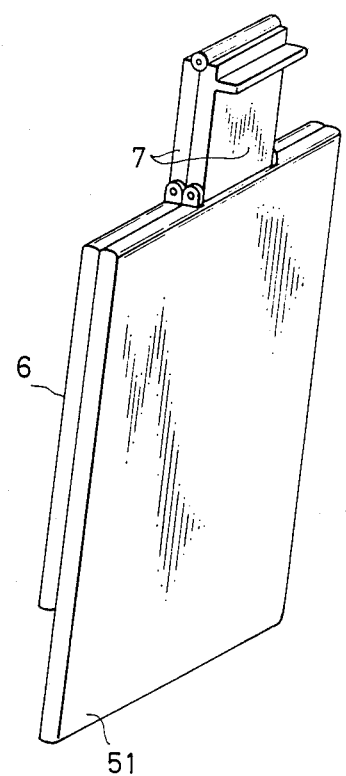

BABY CARRIAGE SERVING AS SHOPPING CART

BACKGROUND OF THE INVENTION

1. Field of the Invention

The present invention generally relates to a baby carriage, and particularly relates to a baby carriage which can also serve as a shopping cart.

2. Background of the Invention

Various types of constructions are known for so-called baby carriages provides to carry babies laid on the baby carriages.

Commonly known among such types of baby carriages are those having a so-called reclining mechanism in which the angle of a backrest relative to a seat portion for seating a baby can be freely changed from an erected state to generally flat state. Further, various types of handle mechanisms for driving the baby carriages are known. For example, some baby carriages have been designed so that a handle is disposed behind a baby so as to be pushed at the rear side of the baby, and some baby carriages have been designed so that a handle bar is disposed so as to be at the front side of the baby to be pushed while facing the adult pusher.

However, the main object of those conventional baby carriages was to carry babies and therefore it was impossible to carry parcel attached to the carriage. Even if a small tray or basket is arranged under the seat or in another place, the small basket was unsatisfactory as a baggage space. Accordingly, it was difficult to use those conventional baby carriages as shopping carts.

On the other hand, there are known shopping carts for single purpose use, for example, cart-type shopping carts in which a handle bar is attached either to a two-wheeled vehicle or to a four-wheeled compact vehicle with narrowly spaced wheels.

However, those shopping carts have had no capability for a rider, because the exclusive object of thereof was literally to carry shopping purchases. No shopping cart have had both a baggage space for shopping and a riding-function portion for carrying a baby. In short, no shopping cart also functioning equally well as a baby carriage has been in existence. As the only case, some shopping carts for old people had a baggage space cover functioning as a seat. However, even in such shopping carts, it was impossible to carry a baby laid on the cover.

SUMMARY OF THE INVENTION

The present invention is intended to ovecome the above-described problems. Accordingly, it is an object of the present invention to provide a baby carriage capable of serving also as a shopping cart, which can be used for carrying a baby as an original purpose of the baby carriage and can be also simultaneously used in shopping for stocking and carrying a great deal of purchases.

It is another object of the invention to provide a baby carriage serving also as a shopping cart, in which when the shopping cart is not required to be used, a portion for stocking purchases can be very compactly folded to make it possible to use the baby carriage only for its original purpose.

It is a further object of the invention to provide a baby carriage serving as a shopping cart in which, when the baby carriage is not required to be used, the whole baby carriage can be compactly folded after the portion for stocking purchases has been folded.

According to an aspect of the present invention, in a folding baby carriage capable of serving also as a shopping cart, a pair of opposite front leg bars, a pair of opposite rear leg bars, and a handle bar disposed across the front leg bars and across the rear leg bars are foldably coupled with each other so as to constitute a body of the baby carriage. A seat (including a backrest portion) is foldably attached to the body of the baby carriage. The improvement of the invention is that a bottomed rectangular package receiving basket is provided so as to be suspended under the seat by attaching the upper end opening portion of the package basket to both sides of the seat and a U-shaped frame bar stretched out in the rear of the seat so as to be able to be erected/fallen. Furthermore, a folding operation portion foldable in two is attached onto the back surface of package basket and is provided to be removably attached to the back surface of the backrest so that the package basket can be folded independently.

BRIEF DESCRIPTION OF THE DRAWINGS

FIG. 3(A) is a partly cutaway perspective view showing the condition of attachment between the commodity receiving portion and the folding operation panel depicted in FIG. 1.

FIG. 3(B) is a perspective view showing the condition that the folding operation panel of FIG. 3(A) is folded in two.

DETAILED DESCRIPTION OF THE PREFERRED EMBODIMENTS

A first embodiment of the present invention will be described hereunder with reference to FIGS. 1 through 4.

Figure 1:
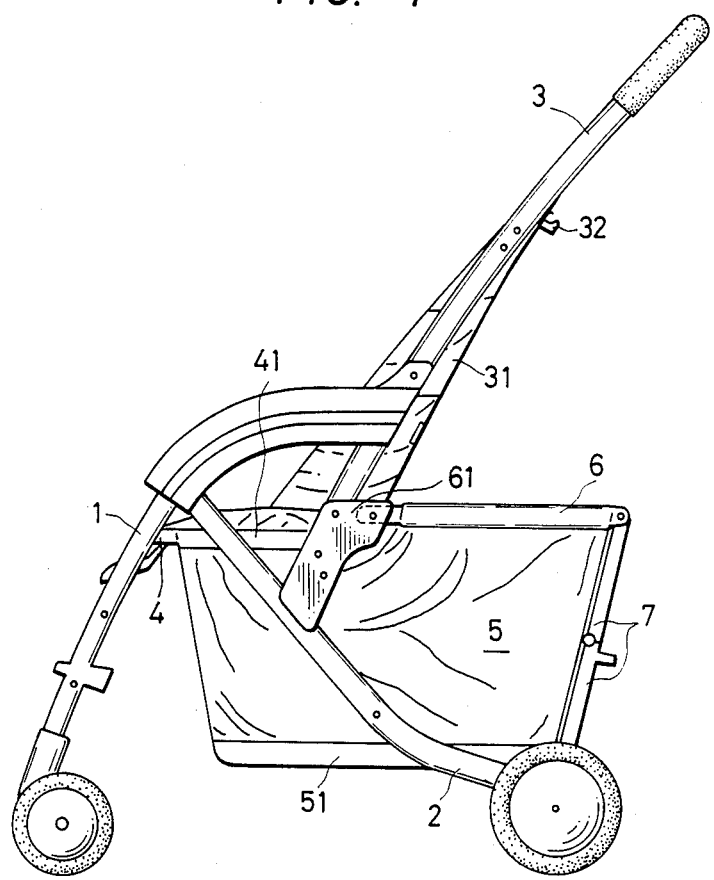
FIG. 1 is a side view of a first embodiment of the present invention.
Figure 2:
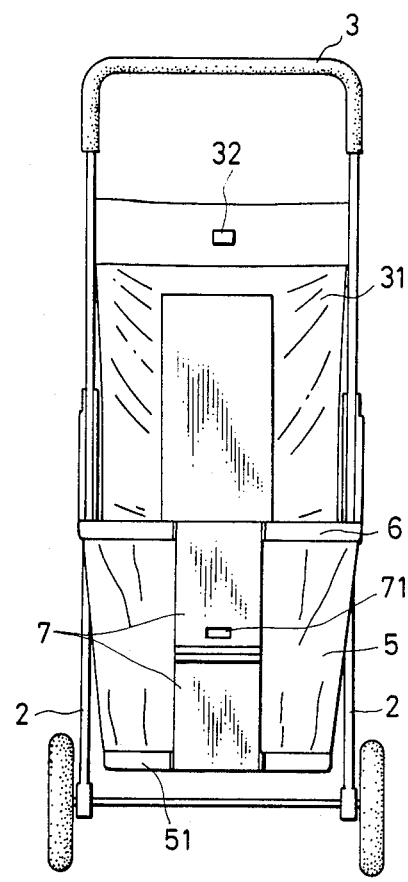
FIG. 2 is a rear elevation of FIG. 1.
Figure 4:
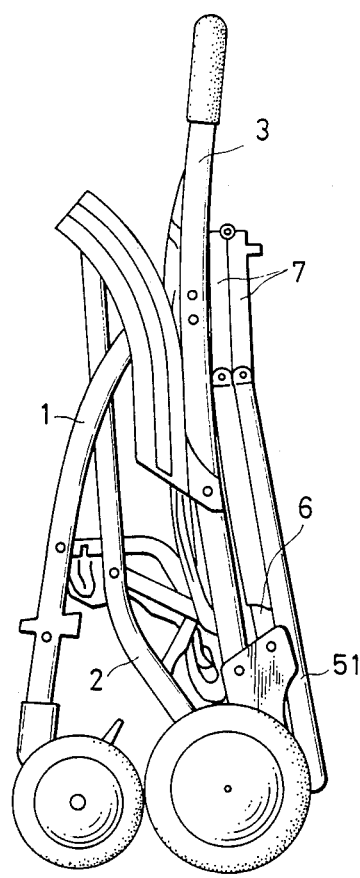
FIG. 4 is a side view showing the condition that the baby carriage of FIG. 1 is folded.

As shown in FIGS. 1 and 2, a pair of front leg bars 1 are respectively coupled with a pair of rear leg bars 2 so that the upper portions of the front leg bars 1 are respectively foldably pivotally attached to the upper ends of the rear leg bars 2 to make each side of the carriage appear in an inverted V-shape. The lower ends of a handle bar 3 of an inverted U-shape in front view are foldably pivotally attached to the middle portions of the rear leg bars 2. The upper ends of the front leg bars 1 are respectively foldably pivoted to the vertically middle portions of the handle bar 3. Thus, the body of a baby carriage is prepared.

A seat frame 4 is attached across part of the front leg bars 1, part of the rear leg bars 2 and part of the handle bar 3. A seat cloth 41 and a backrest cloth 31 are respectively stretched across the seat frame 4 and part of the handle bar 3.

A package basket 5 is constructed by use of relatively hard cloth such as canvas or other material. The package basket 5 is formed as a deep box-like container with its upper end opened.

The upper opening portion of the package basket 5 has its front half attached to the seat frame and its rear half attached to a frame bar 6 which is U-shaped in plane view so as to be stretched from brackets 61 attached to the lower ends of the handle bar 3. The frame bar 6 is pivotally attached to the brackets 61 so as to be able to be folded and unfolded. Although the seat frame 4 is also pivotally attached to the brackets 61 so as to be able to be folded and unfolded, the method of attachment will be understood with reference to a second embodiment which will be described later (see FIG. 9). As shown also in FIGS. 3(A) and 3(B), the package basket 5 has a bottom 51. A board or the like having appropriate thickness and weight is attached to the bottom 51 so as to be effective for maintaining the shape of the deep box-like container. An operation panel 7 folds the package basket 5. The folding operation panel 7 is formed so as to be able to be folded in two at its center. A engagement/stopping hole 71 is provided in the center of the folding operation panel folded in two, the engagement/stopping hole 71 having the function of maintaining the folded state. The engagement/stopper hole 71 is releasably engaged with an engagement/stopper hook 32 attached to the rear surface of the backrest cloth 31 in the body of the baby carriage.

According to this embodiment, since the folding operation panel 7 is foldably attached to the rear surface of the package basket 5, if the folding operation panel 7 in the state of FIG. 3(A) is folded in two as illustrated in FIG. 3(B) and pulled up in the direction of the arrow of FIG. 3(A), the bottom board 51 is pulled up so that the package basket 5 is forcedly pulled up as whole. The package basket 5 thus forcedly pulled up can be easily maintained in the folded state, shown in FIG. 4, by engaging the engagement/stopper hook 32 of the backrest cloth 31 with the engagement/stopper hole 71 of the folding operation panel 7. The package baskets 5 is folded and engaged not only when the body of the baby carriage should be folded but also when the carriage is used for its one function as a baby carriage without the necessity of using it for its other function as a shopping cart.

Although this embodiment has shown the case where the folding operation panel 7 is formed of a material shaped like a board over its whole surface, it is a matter of course that the invention is not limited to the specific embodiment but the material can be replaced by a small-diameter metal wire or bar prepared by bending.

Next, a second embodiment of the present invention will be described with reference to FIGS. 5 through 9.

A pair of front leg bars 101 pivot at the tops near the pivot points of a pair of rear leg bars 102. On each side of the baby carriage, the two leg bars 101 and 102 are pivotally attached through a pivot to one of a pair of armrest bars 103 so that the upper ends of the leg bars 101 and 102 are combined at one place. Thus, the two leg bars 101 and 102 are reverse V-shaped in side view, and the distance between the lower ends of the two bars 101 and 102 can be changed by an opening or closing operation.

The carriage is pushed by a handle bar 104 which is reverse U-shaped in front view. The base ends of the handle bar 104 are respectively pivotally attached to the top ends of folding operation bars 105. The base ends of the respective armrest bars 103 are pivotally attached to the handle bar 104 at portions thereof slightly higher than the respective pivotal portions of the folding operations bars 105.

Each of the folding operation bars 105 is reverse L-shaped in side view and has a lower end portion pivotally attached to the corresponding rear leg bar 102 so that it is parallel to the rear leg bar 102. Each of the folding operation bars 105 also has an upper end portion pivotally attached to the handle bar 104 so as to be in contact with the upper surface of the rear leg bar 102. The folding operation bar 105 is constructed so as to be able to be inverted around the lower end pivotal portion toward the rear of the rear leg bar 102 when the baby carriage is folded.

A pair of seat frames 106 are interposed between the front leg bar 101 and the rear leg bar 102 on each side of the baby carriage. A seat cloth 161 and a backrest cloth 131 are respectively stretched between the seat frames 106 and between both sides of the handle bar 104.

A package basket 107 is formed by use of relatively hard cloth, such as canvas, mesh cloth, or the like. The package basket 107 is provided in the form of a deep box-like container having its upper end opened.

Figure 9:
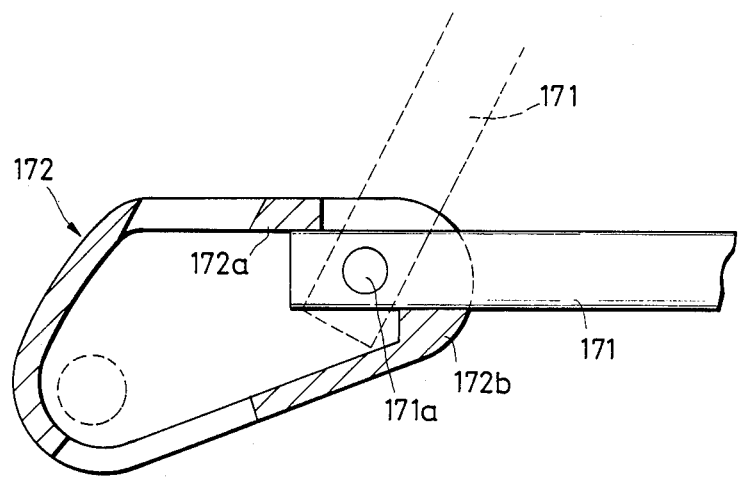
FIG. 9 is a vertical section of one of brackets showing the pivotal attachment of the frame bar depicted in FIG. 5.

A frame bar 171 U-shaped in plan view is provided at the upper opening portion of the package basket 107 in order to maintain the shape of its upper opening. The frame bar 171 is pivotally attached to brackets 172 attached to the lower ends of the handle bar 104 so that, as shown in FIG. 9, both ends of the frame bar 171 can come into contact with respective stopper/engagement surfaces 172a and 172b formed within the brackets 172 to make it possible that the frame bar 171 can be switched from the horizontal state to an elevated state. A cloth material having a thickness suitable for maintaining the shape, or a hard board material is attached to a bottom 109 of the package basket 107 so as to be effective for maintaining the shape of the deep box-like container.

Figure 5:
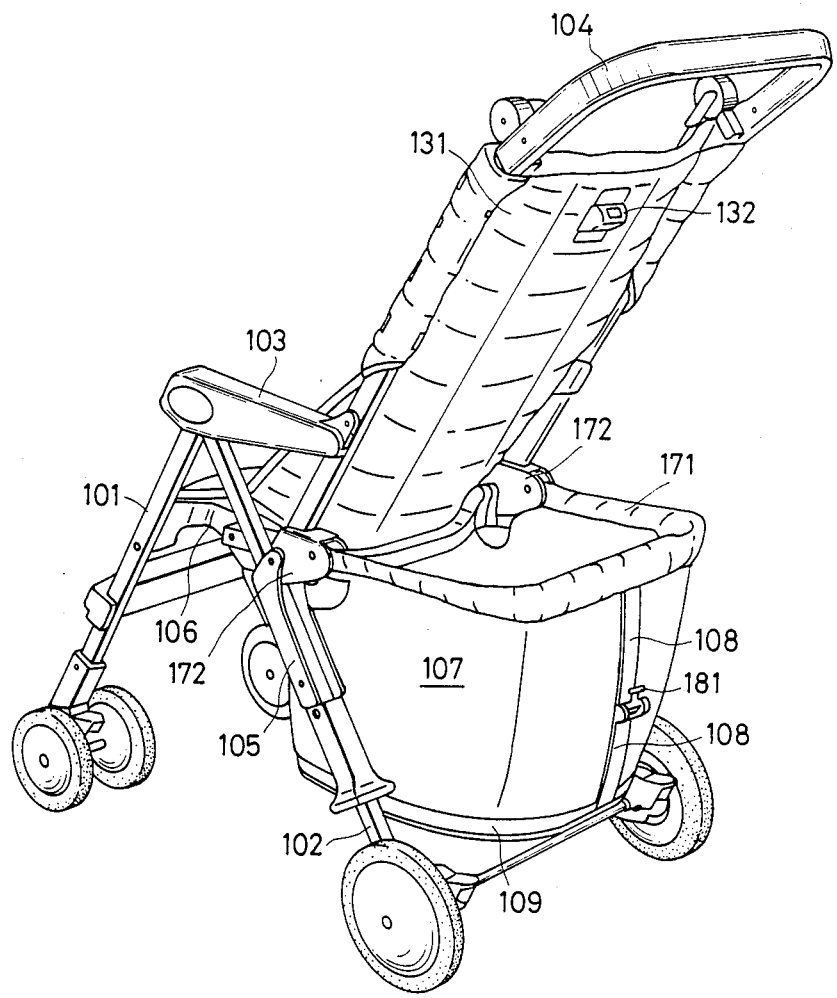
FIG. 5 is a perspective view of a second embodiment of the present invention.
Figure 6:
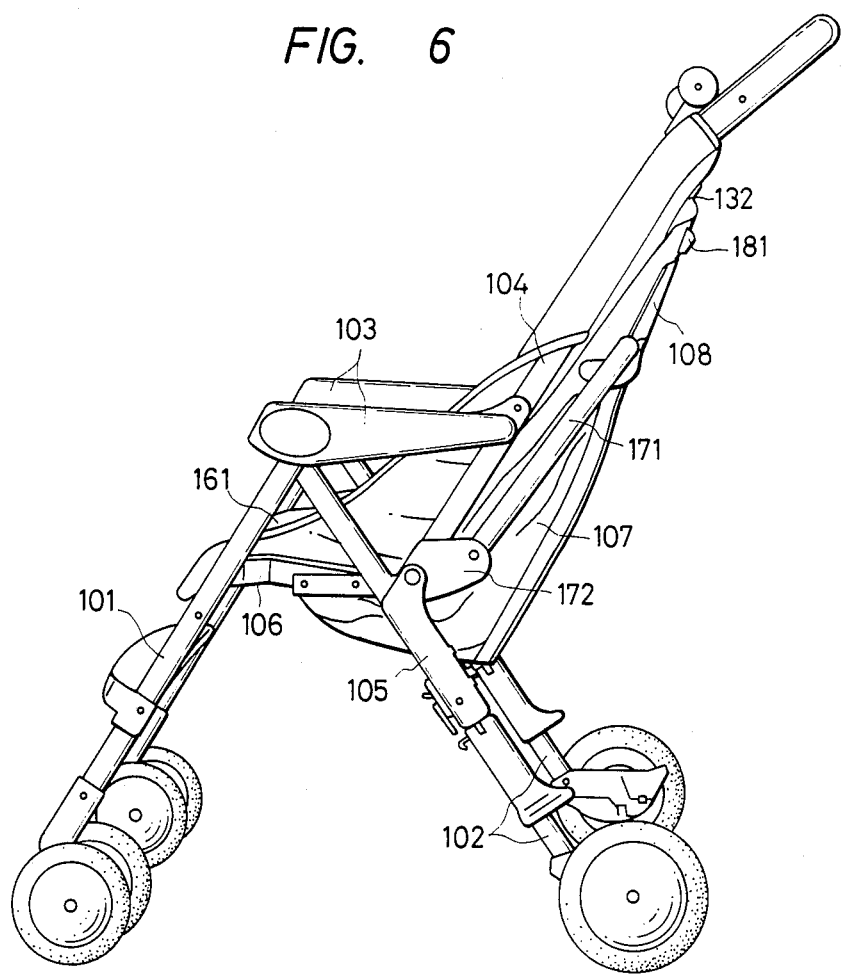
FIG. 6 is a side view showing the condition that the package basket depicted in FIG. 5 is folded.
Figure 7:
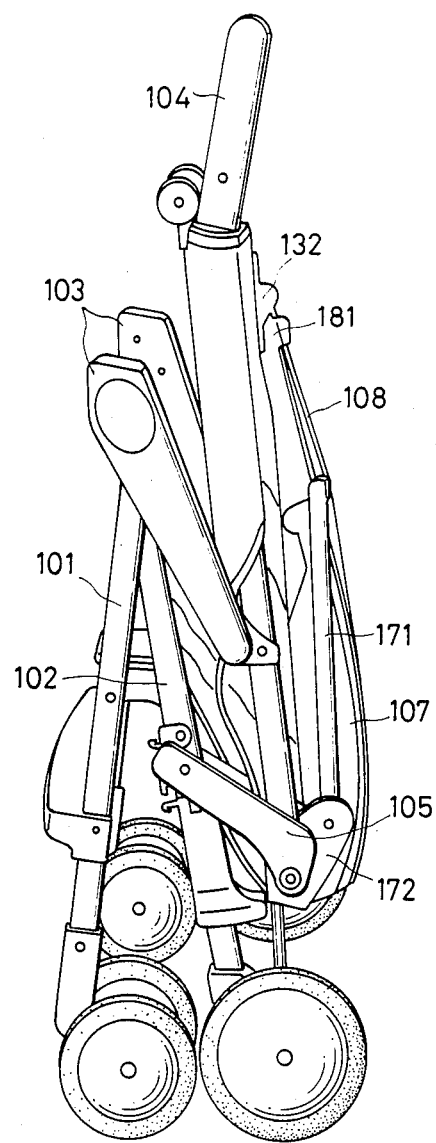
FIG. 7 is a side view showing the condition that the baby carriage of FIG. 6 is folded.
Figure 8A:
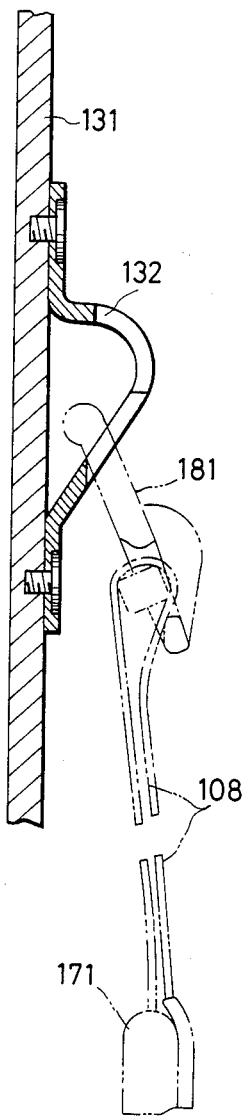
FIG. 8(A) is a vertical section showing a fastening attached to the rear surface of the backrest cloth depicted in FIG. 5.
Figure 8B:
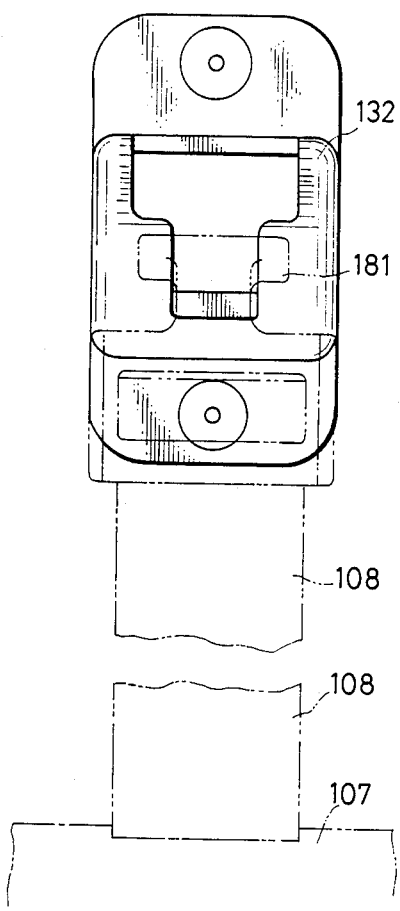
FIG. 8(B) is a front elevation of FIG. 8(A).

As is shown in perspective in FIG. 5 and in detailed cross section in FIG. 8A, an operation band 108 is used for folding the package basket 107. The folding operation band 108 is formed of a piece of tape-like cloth, leather, or the like, having an appropriate thickness and an appropriate width. The folding operation band 108 is provided with a hook-like engagement/stopper 181, shown in plan view in FIG. 8B, attached to the longitudinal center of the folding operation band 108 in order to maintain the folded state. The engagement/stopper 181 is releasably engaged with an engagement bracket 132 attached to the rear surface of the backrest cloth 131 in the body of the baby carriage.

According to this embodiment, when the double function of carrying a baby and carrying baggage is required at the same time or when the single function of carrying baggage is required, the functions can be easily attained by arranging the upper opening of the package basket in the opened state as illustrated in FIG. 5.

For the purpose of stocking a great amount of baggage in the package basket 107 and in order to maintain the upper opening of the package basket 107 in the opened state, pin-like or plate-like bearing members (not shown) may be provided at the lower end portions of the rear leg bars 102 or at the middle portions of rear wheel-shafts so that the bottom 109 of the package basket 107 may rest on the bearing members. Such bearing members can also be used in the first embodiment.

When the function of carrying baggage is not required, the package basket can be folded in the following manner. That is, the folding operation band 108 attached to the rear surface of the package basket 107 is pulled up while grasping the engagement/stopper 181. With the pulling operation, the bottom of the package basket is pulled up through the folding operation band 108 so that the package basket is forcedly biased upward and reduced in thickness as a whole. With the progress of forced biasing of the package basket 107, the height of the holding operation band 108 folded in two becomes maximum so that the engagement/stopper 181 attached to the top end of the folding operation band 108, now folded in two, can be engaged with the engagement/stopper bracket 132 attached to the rear surface of the backrest cloth 131. Thus, the package basket 107 can be kept in the collapsed and forcedly biased state and can be compactly folded at the rear surface of the backrest cloth 131.

Although this embodiment has shown the case where the folding operation band 108 is formed of a material shaped like a tape over its whole surface, it is a matter of course that the invention is not limited to the specific embodiment but the material can be replaced by a small-diameter metal wire or a soft rope.

Further, it is a matter of course that the seat cloth 161 and the backrest cloth 131 may be formed of synthetic resin and that the same effect can be attained in this case.

According to the present invention constructed as described above, it is possible to form a commodity receiving portion having a very large opening formed at the side of the rear surface of the backrest portion and on a wide area from the lower portions of the seat frames to the lower ends of the rear leg bars. Accordingly, a great amount of baggage can be carried simultaneously with seating a baby on the seat.

Further, when the function of carrying baggage is not required, the package basket can be very compactly folded and bundled by only a very simple operation of engaging the package basket with the rear surface of the backrest portion. After the package basket is folded, the baby carriage can be easily folded as a whole.

Furthermore, when the package basket in the folded state should be unfolded, the package basket can fall down owing to its own weight by simply releasing the engaged/closed state.

As described above, according to the present invention, the two functions of seating/carrying a baby and carrying baggage can be effectuated without a reduction in quality of either one of the two functions. Accordingly, the invention has the excellent effect which could not be expected in the conventional baby carriages.

What is claimed is:

1. A folding baby carriage and shopping cart, comprising:
    a pair of opposite front leg bar;
    a pair of opposite rear leg bars;
    a handle bar disposed across said front leg bars and across said rear leg bars, wherein said front and rear leg bars and said handle bars are foldably coupled with each other so as to constitute a body of said baby carriage;
    a seat including a backrest portion attached to said body of said baby carriage;
    a U-shaped frame bar extending rearwardly of said seat and pivotally attached to said body of said baby carriage, wherein said U-shaped frame bar may be erected or folded;
    an attachment part disposed on a back surface of said backrest portion;
    a rectangular bottomed commodity receiving portion suspended under said seat by attaching an upper end opening portion of said commodity receiving portion to both sides of said seat and said U-shaped frame; and
    a folding operation portion foldable in two attached onto a back surface of said commodity receiving portion and removably attachable to said attachment part so that said commodity receiving portion can be folded independently of said front and rear leg bars.

2. A baby carriage and shopping cart according to claim 1, in which said U-shaped frame bar is stretched out from lower ends of said handle bar.

3. A baby carriage and shopping cart according to claim 1, in which said U-shaped frame bar is stretched out from brackets attached to the lower ends of said handle bar.

4. A baby carriage and shopping cart according to claim 1, in which said commodity receiving portion has a body made of a hard cloth and in which a bottom board is attached to a bottom of said commodity receiving portion.

5. A baby carriage and shopping cart according to claim 1, in which said folding operation portion is arranged so as to be able to be folded in two at a center thereof.

6. A baby carriage and shopping cart according to claim 5, in which said folding operation portion is constituted by a folding operation panel shaped like a board over its whole surface.

7. A baby carriage and shopping cart according to claim 5, in which said folding operation portion is constituted by a folding operation band shaped like a belt having flexibility over its whole surface.

8. A baby carriage and shopping cart according to claim 6, in which an engagement/stopper hole is provided at a center of folding of said folding operation panel so as to be releasably engaged with an engagement/stopper portion attached onto the back surface of said backrest portion.

9. A baby carriage and shopping cart according to claim 7, in which a hook-like engagement/stopper is provided at a center of folding of said folding operation band so as to be releasably engaged with an engagement/stopper portion attached to the back surface of said backrest portion.

10. A baby carriage and shopping cart according to claim 1, in which said seat and said backrest portion are formed by stretching a seat cloth and a backrest cloth on a seat frame and a part of a handle frame, respectively.

11. A baby carriage capable of serving also as a shopping cart according to claim 1, in which said seat and said backrest portion comprise synthetic resin.

* * * * *